United States Patent
Mitchell

(10) Patent No.: US 11,757,805 B2
(45) Date of Patent: *Sep. 12, 2023

(54) SYSTEMS AND METHODS FOR MEDIATION USING NLP AND MACHINE LEARNING TECHNIQUES

(71) Applicant: Cameron P. Mitchell, San Carlos, CA (US)

(72) Inventor: Cameron P. Mitchell, San Carlos, CA (US)

(*) Notice: Subject to any disclaimer, the term of this patent is extended or adjusted under 35 U.S.C. 154(b) by 270 days.

This patent is subject to a terminal disclaimer.

(21) Appl. No.: 17/246,313

(22) Filed: Apr. 30, 2021

(65) Prior Publication Data

US 2021/0258270 A1    Aug. 19, 2021

Related U.S. Application Data

(63) Continuation of application No. 16/582,849, filed on Sep. 25, 2019, now Pat. No. 11,025,567.

(51) Int. Cl.
| | |
|---|---|
| *H04L 51/02* | (2022.01) |
| *G06F 9/451* | (2018.01) |
| *G06F 40/20* | (2020.01) |
| *G06Q 50/18* | (2012.01) |
| *G06F 40/30* | (2020.01) |

(52) U.S. Cl.
CPC .............. *H04L 51/02* (2013.01); *G06F 9/453* (2018.02); *G06F 40/20* (2020.01); *G06F 40/30* (2020.01); *G06Q 50/182* (2013.01)

(58) Field of Classification Search
CPC ... G10L 15/18; G10L 2015/088; H04L 51/02; H04L 51/04; H04L 67/535
See application file for complete search history.

(56) References Cited

U.S. PATENT DOCUMENTS

| | | | | |
|---|---|---|---|---|
| 9,691,199 B1* | 6/2017 | Rapp | ................... | G07C 9/00571 |
| 2015/0178371 A1* | 6/2015 | Seth | ..................... | G06F 16/2428 |
| | | | | 707/755 |
| 2015/0372963 A1* | 12/2015 | Root | ....................... | H04L 51/42 |
| | | | | 709/206 |

* cited by examiner

*Primary Examiner* — Hitesh Patel
(74) *Attorney, Agent, or Firm* — Ansari Katiraei LLP; Sadiq Ansari

(57) ABSTRACT

A system described herein may provide techniques for using machine learning and/or other techniques to monitor a conversation between two or more conversation participants through a messaging program. The system may utilize natural language processing ("NLP") to determine the intent of phrases and/or words sent between mediation participants. The system may determine to take remedial measures, such as modifying, delaying, and/or rejecting a message from one of the participants when a score for the message exceeds a dynamic score threshold determined by the system based on one or more factors, such as the demographic information of the mediation participants, nature of the mediation, length of mediation, communications among mediation participants, and/or other factors.

18 Claims, 14 Drawing Sheets

US 11,757,805 B2

SYSTEMS AND METHODS FOR MEDIATION USING NLP AND MACHINE LEARNING TECHNIQUES

CROSS-REFERENCE TO RELATED APPLICATION

This Application is a Continuation of U.S. patent application Ser. No. 16/582,849 filed on Sep. 25, 2019, titled "SYSTEMS AND METHODS FOR MEDIATION USING NLP AND MACHINE LEARNING TECHNIQUES," the contents of which are herein incorporated by reference in their entirety.

BACKGROUND

Devices, such as mobile telephones, tablet computers, etc. offer options for users to message each other. Some users may wish to engage in mediation sessions, in which participants are able to resolve issues under the guidance of a trained mediator.

DETAILED DESCRIPTION OF THE PREFERRED EMBODIMENTS

The following detailed description refers to the accompanying drawings. The same reference numbers in different drawings may identify the same or similar elements.

Mediation provides an avenue for a guided resolution between various participants. However, conventional in-person mediation services may be inconvenient and be prohibitively expensive. As described herein, an IMMS provides a convenient and more affordable avenue for mediation to occur by allowing participants to use a user equipment ("UE")—such as computer, mobile telephone, and/or other device capable of sending and receiving communication—to participate in a mediated conversation at their convenience. However, in many instances, involving a human mediator in the mediated conversation may be slow and costly (e.g., may require the constant supervision of a mediator). Embodiments described herein may use machine learning and/or other techniques to analyze messages to detect improper messages and, if necessary, take remedial measures. For instance, as described below, the IMMS may detect a message which may be deemed offensive, unproductive, ambiguous, and/or otherwise in need of remediation, and may suggest message modifications, reject the message, delay the message, and/or perform other remedial measures.

Figure 1A:
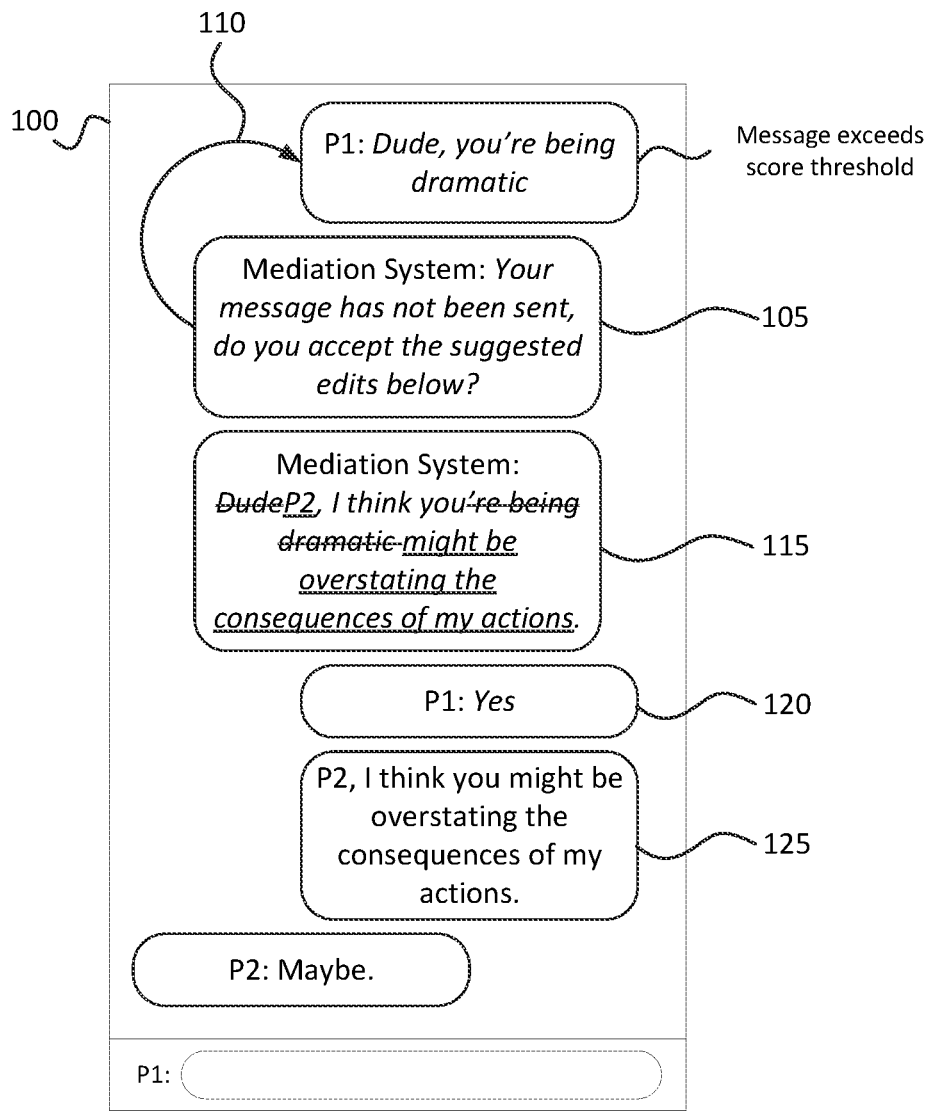
FIGS. 1A and 1B illustrate an example application of the intelligent mediation message system ("IMMS"), depicted, respectively, from the perspective of the sending participant and the receiving participant, in which the IMMS detects a message exceeding a message score threshold and suggests modifications to the message.

As shown in FIG. 1A, for example, user interface 100 may depict a conversation between two example participants ("P1" and "P2") in a mediation session, in accordance with some embodiments. As described herein, the mediation session may be administered by the IMMS (e.g., the IMMS may detect messages that may need remediation, and may perform different remediation measures based on the content of the messages, the overall intent of the conversation, the relationship between the two parties, and/or other factors). As shown, for example, user P1 may send a message saying "Dude, you're being dramatic." In some embodiments, the IMMS may determine that this message exceeds a message score threshold (e.g., a threshold indicating that the message should be remediated). As described below, the message score threshold may be modified by various factors, including, but not limited to, the frequency of messages, the overall conversation intent (or "temperature"), the content or intent of the message, and/or specific characteristics of the mediation participants. Here, for example, the message may exceed the message score threshold based on the content of the message, rather than a high message score threshold. As shown, the IMMS may analyze the message and take an appropriate remedial measure. For example, in this instance, the IMMS recommends alternative language for the message. As described below, the IMMS may determine substitute phrases and/or words by using natural language processing ("NLP") and/or other suitable techniques to determine a syntactical meaning or intent of the message, and may use machine learning and/or other suitable techniques to determine phrases and/or words having a similar meaning, but in a more appropriate manner (e.g., where a message score for the replacement message does not exceed the message score threshold). The IMMS may recommend replacement language to the sending participant and request approval from the sending participant.

For instance, as shown in FIG. 1A, the IMMS may intercept the message prior to the message being sent to P2 and may prevent the intercepted message from being sent to P2. In some embodiments, the IMMS may present, via user interface 100, notification message 105, indicating that the message was not sent. The IMMS may also present, via user interface 100, arrow 110 between the message and notification message 105. Arrow 110 may indicate that notification message 105 is related to the triggering message (e.g., the message which exceeded the message score threshold), and may also be used to indicate that the triggering message was not sent. The IMMS may also use other types of indicators (e.g., a notification popup, message quote, a different font, such as an italicized or struck through font, different size, bolding, a different typeface, color, or the like) to indicate that a message has not been sent to the other user P2. In this figure, for example, italics are used for messages that are not sent to P2, while non-italic fonts are used for messages that are sent between users P1 and P2.

Additionally, notification message 105 may include a prompt ("do you accept the suggested edits below?"), asking if the user accepts a replacement for the message (indicated in suggestion message 115). As shown, suggestion message 115 may include a replacement for the original message. As described herein, the IMMS may have generated the replacement message by using NLP and/or other suitable techniques to determine an intent and/or meaning of the original message (e.g., in the context of one or more other messages, in some embodiments, where the context of multiple different messages may have an effect on the intent or meaning of the original message). In some embodiments, the IMMS may use machine learning and/or other suitable techniques to determine the replacement message. For example, the IMMS may maintain information indicating that the phrase "might be overstating the consequences of my actions" has been viewed favorably by mediation participants (e.g., in comparison to other candidate phrases, and/or in comparison to the phrase "you're being dramatic"). For instance, the IMMS (and/or some other system) may have determined that past recipients of the replacement phrase have responded with messages that have a more favorable or amicable intent (e.g., as determined through NLP or other suitable techniques) than the original phrase.

As further shown, P1 may affirmatively respond (via message 120) to the prompt. Because the IMMS previously sent a prompt (e.g., via messages 105 and 115), the IMMS may be able to use NLP and/or other suitable techniques to determine that a message from the user is a response to the prompt (e.g., an affirmative response such as "yes," "yeah," "definitely," etc., even if these responses are not pre-configured to be recognized by the IMMS).

Figure 1B:
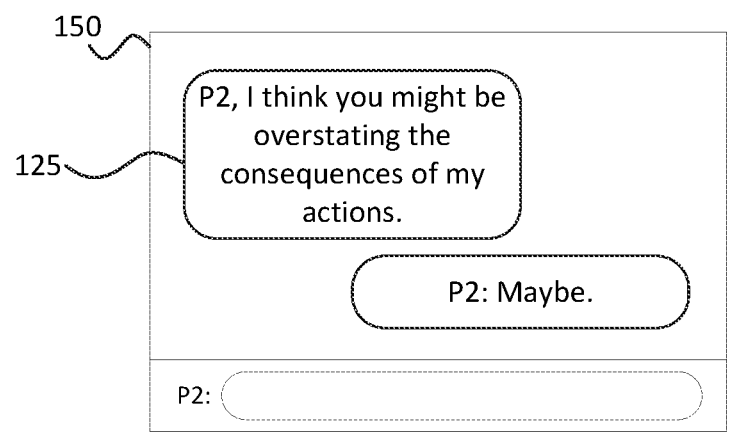

Once the affirmative response is received by the IMMS, the IMMS may send message 125 on behalf of user P1. That is, from the standpoint of user P2, it may be indistinguishable which messages were typed by user P1 and which messages were provided/edited by the IMMS. For instance, as shown in FIG. 1B, user interface 150 (e.g., as displayed on a UE associated with user P2) may not receive or present any of messages 105-120. Further, user interface 150 may present message 125 as though it was sent by the IMMS on behalf of P1. As demonstrated in FIGS. 1A and 1B, message 125 may be presented in the font format indicating a sent message (e.g., in this instance, non-italic font) on user interfaces 100 and 150.

Figure 2:
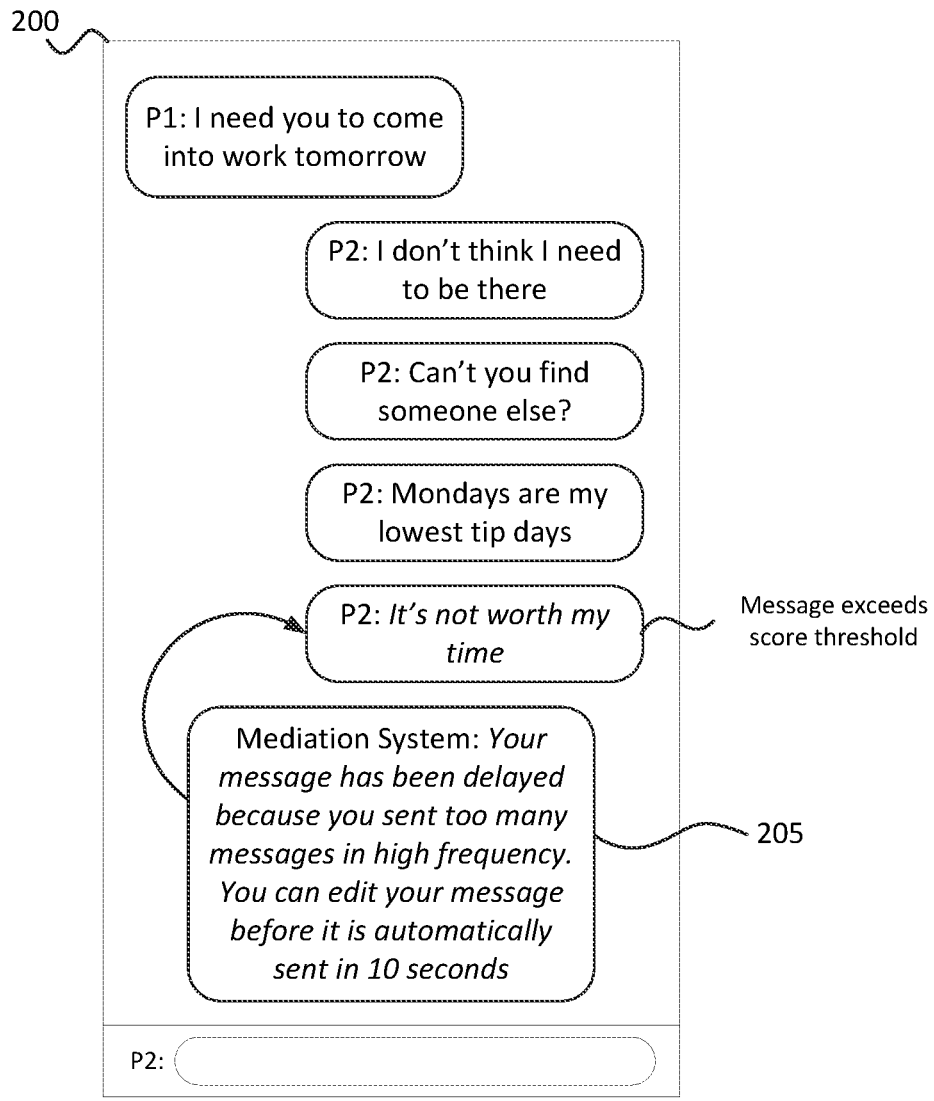
FIG. 2 illustrates an example application of the IMMS in which the IMMS detects a message exceeding the message score threshold and delays the message.

The IMMS may, in some embodiments, use message frequency as a factor in determining whether a given message exceeds a message score threshold. As shown in FIG. 2, for example, user P2 may send a series of messages (e.g., via user interface 200) without a response from user P1. As described below, the message score threshold may be modified by various factors, including, but not limited to, the frequency of messages, response from other participants, a quantity of consecutive messages from one party without a response from the other party, or the like. Here, for example, the message score threshold may be modified as a result of the high frequency of messages, lack of response from user P1, and message intent (e.g., here, the intent may be seen as insulting). As further depicted here, the triggering message ("It's not worth my time") may exceed the message score threshold based on the frequency of messages and lack of response from user P1, whereas it may not exceed the message score threshold in other scenarios. In some embodiments, a message score may be modified (e.g., by a factor or increment) instead of the message score threshold. For example, as depicted here, the message score for the triggering message ("It's not worth my time") may be modified by a factor as a result of the number of messages sent by user P2, causing the triggering message to exceed the message score threshold. As shown, the IMMS may analyze the message and take an appropriate remedial measure. For example, in this instance, the IMMS delays the message.

For instance, as shown in FIG. 2, the IMMS may intercept the triggering message prior to being sent to P1 and may prevent the message from being sent to P1. In some embodiments, the IMMS may present, via user interface 200, notification message 205, indicating that the message was not sent. In some instances, the IMMS may notify the participant why the message was not sent. For example, here, the IMMS indicates that the message was delayed because the user sent too many messages in high frequency. In some embodiments, the IMMS may update notification message 205 as time progresses (e.g., simulate a countdown timer by changing the number of seconds left before automatically sending the message).

Additionally, notification message 205 may include an indication ("You can edit your message before it is automatically sent in 10 seconds") allowing the participant to modify the message before it is transmitted. In some embodiments, the participant may select the triggering message and input a new message. In further embodiments, the participant may type a response indicating the desire to modify the message before transmission. In such an embodiment, the IMMS may be able to utilize NLP and/or other suitable techniques to determine that a message from the user is a response to the indication (e.g., "modify," "yes," "change," etc.). In some embodiments, the IMMS will not automatically send a user-modified message, but instead require the user to resubmit that message (e.g., the IMMS will treat the message as a new message and score it to determine whether to take a remedial measure). If the user does not take an action, the IMMS may send the triggering message on behalf of user P2. That is, from the standpoint of user P1, the message may be indistinguishable that the message was sent by user P2 or the IMMS or that any remedial measure was taken (e.g., as in this instance, that the message was delayed).

Figure 3:
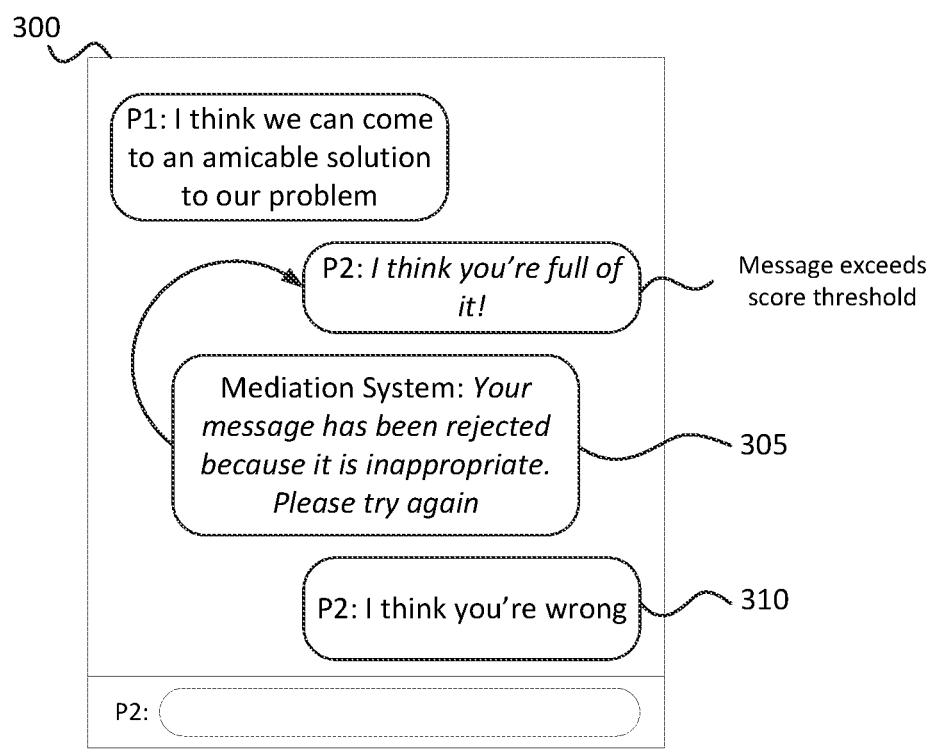
FIG. 3 illustrates an example application of the IMMS in which the IMMS detects a message exceeding the message score threshold and rejects the message.

In some embodiments, the IMMS may reject a user-submitted message. As shown in FIG. 3, for example, user P2 may send a message (e.g., via user interface 300) saying, "I think you're full of it." As shown, the IMMS may analyze the message and take an appropriate remedial measure. Here, for example, the IMMS may determine that the message exceeds the message score threshold based on the content of the message. In this instance, the IMMS rejects the message and requests user P2 to submit a new message (e.g., at message 305).

As further shown, P2 may attempt to submit a new message to the IMMS (via new message 310). This new message may be analyzed by the IMMS to determine which, if any, remedial measure should be taken. As demonstrated here, new message 310 does not exceed a message score threshold and is sent to user P1.

Figure 4:
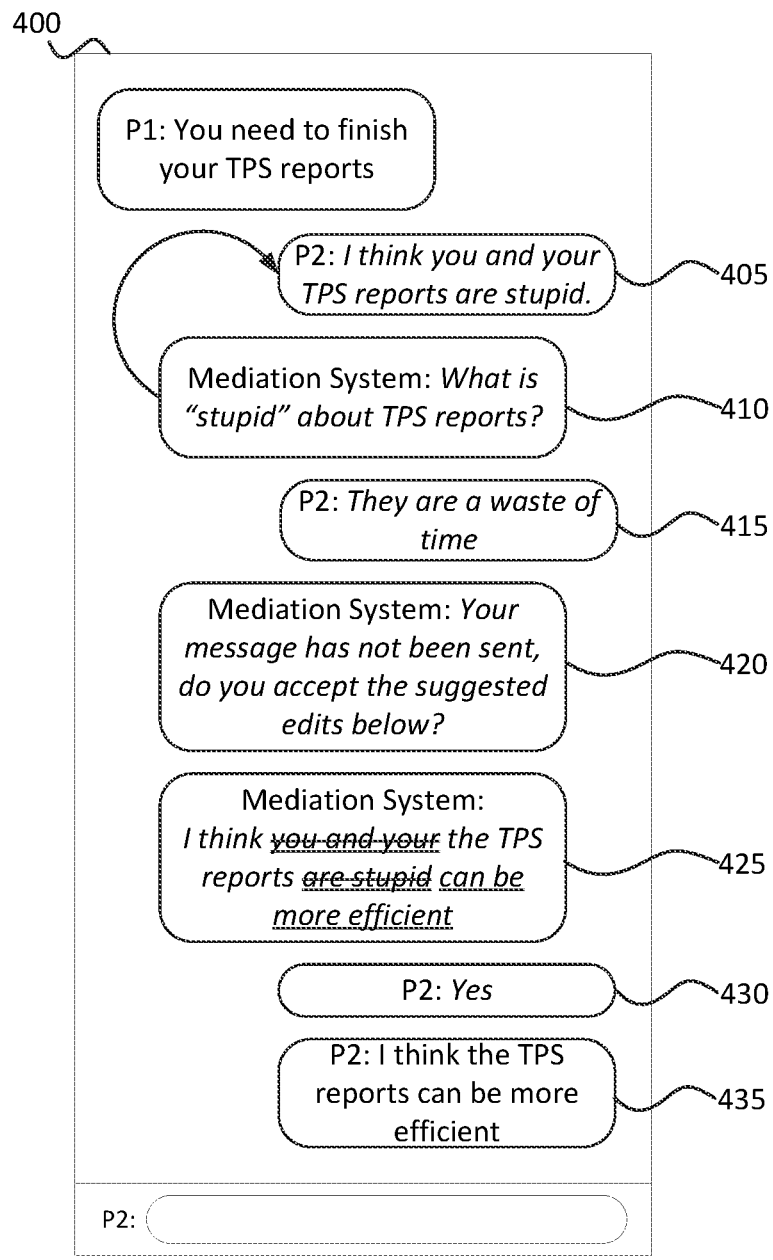
FIG. 4 illustrates an example application of the IMMS in which the IMMS interacts with a user in order to guide the user to modify a message that exceeds a message score.

In some embodiments, the IMMS may interact with a user in order to guide the user to modify a message that exceeds a message score threshold. As shown in FIG. 4, for example, user P2 may submit a message (depicted as triggering message 405 in user interface 400) saying "I think you and your TPS reports are stupid." In some embodiments, the IMMS may determine that this message exceeds a message score threshold. Here, for example, the message may exceed the message score threshold based on the content of the message. As shown, the IMMS may analyze the message and take an appropriate remedial measure. For example, in this instance, the IMMS may attempt to clarify ambiguous language, recommend replacement language to the sending participant, and request approval from the sending participant.

For instance, as shown in FIG. 4, the IMMS may intercept triggering message 405 prior to triggering message 405 being sent to P1 and may prevent triggering message 405 from being sent to P1. In some embodiments, the IMMS may present, via user interface 400, notification message 410, indicating that triggering message 405 was not sent.

As described, the IMMS may display, via user interface 400, a message asking the user to explain ambiguous language (demonstrated here as notification message 410, "What is 'stupid' about TPS reports?"). In some embodiments, the IMMS may use machine learning and/or other suitable techniques to determine whether a phrase and/or word is ambiguous. For instance, the IMMS may maintain information that indicates that when a given message has been sent to users in the past, the receiving participant has responded with a statement indicating their confusion, such as, "I don't know what you mean," "I'm confused," "what do you mean," etc. In some embodiments, the IMMS may use NLP and/or other suitable language recognition techniques to determine whether a phrase and/or word is vague or otherwise unclear (e.g., multiple intents exist and it is ambiguous as to which is used, and/or the IMMS is unable to determine a meaning or intent of the message). The user may then provide additional information to clarify the statement (e.g., demonstrated here as response message 415, "They are a waste of time").

Additionally, the IMMS may display message 420 with a prompt ("do you accept the suggested edits below?"), asking if the user accepts a modified message (indicated in suggestion message 425). As shown, suggestion message 425 may include a replacement for the original message and the explained message (e.g., here, the user response provided via response message 415). As described herein, the IMMS may generate the replacement message by using NLP and/or other suitable techniques to determine an intent and/or meaning of the original message. In some embodiments, the IMMS may use machine learning and/or other suitable techniques to determine the replacement message. For example, the IMMS may maintain information indicating that the phrase "can be more efficient" has previously been viewed favorably by mediation participants (e.g., in comparison to other candidate phrases, and/or in comparison to the phrase "are a waste of time"). For instance, the IMMS (and/or some other system) may have determined that past recipients of the replacement phrase have responded with messages that have a more favorable or amicable intent (e.g., as determined through NLP and/or other suitable techniques) than the original phrase. Similarly, the IMMS may remove or modify language that is derogatory, negative, or insulting (e.g., as determined through information maintained in a language repository or through NLP and/or other suitable techniques). For instance, the IMMS may remove the phrase "you . . . are stupid" because the phrase may be determined to be derogatory or insulting (e.g., because it attacks the intelligence of another participant).

As further shown, P2 may affirmatively respond (via message 430) to the prompt (e.g., message 420). Because the IMMS previously sent a prompt (e.g., via message 420), the IMMS may be able to use NLP and/or other suitable techniques to determine that a message from the user is a response to the prompt. Here, for example, the IMMS recognizes the affirmative response in message 430 ("Yes").

Once the affirmative response is received by the IMMS, the IMMS may send message 435 on behalf of user P2. That is, from the standpoint of user P1, it may be indistinguishable which messages were typed by user P1 and which messages were provided/edited by the IMMS (e.g., user P1 will see message 435 as though P2 sent message 435).

Figure 5A:
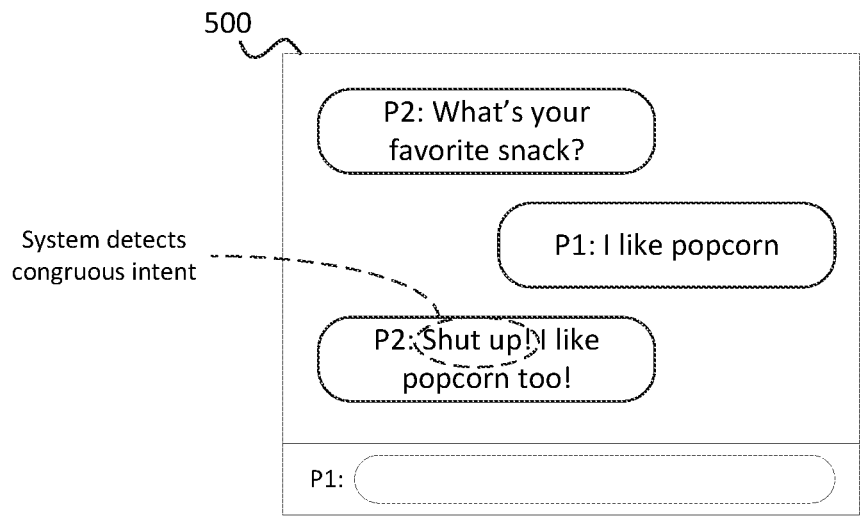
FIGS. 5A and 5B illustrate the ability for the IMMS to handle similar phrases and/or words differently based on conversation context.
Figure 5B:
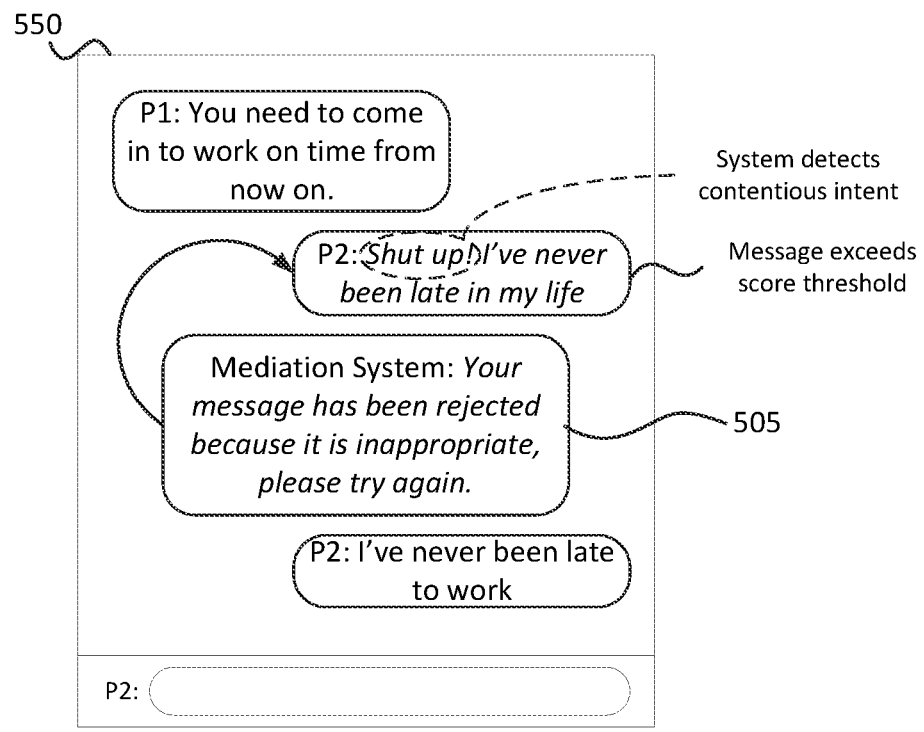

In some embodiments, the IMMS may use NLP and/or other suitable techniques to determine the intent of a message and, in doing so, may distinguish between two different uses of the same phrase and/or word. Accordingly, the IMMS may handle the same phrase and/or word in different manner based on the determined intent or participant characteristics (e.g., participant relationship, demographic characteristics, etc.). In FIG. 5A, for example, the IMMS may determine the intent of a phrase ("Shut up!", in this example) to be congruous. However, in FIG. 5B, for example, the IMMS may determine the intent of the same phrase to be contentious and cause the message score to exceed the message score threshold. As a separate example, the IMMS may determine the use of a phrase (here, "Shut up!") to be congruous when used between close friends (e.g., as depicted in FIG. 5A) but contentious when used between a supervisor and employee (e.g., as depicted in FIG. 5B). The IMMS may take an appropriate remedial measure against contentious phrases. For example, as depicted in FIG. 5B, the IMMS may reject the message. The relationship of the participants may be determined based on information provided by the participants (e.g., one or more of the participants may indicate their relationship to each other), and/or the relationship may be determined based on other factors (e.g., participants with a same last name may be inferred to be related; social media accounts associated with the participants may indicate a relationship; etc.).

As shown in FIG. 5B, the IMMS may present (via user interface 550) notification message 505 indicating that the message has not been sent and a prompt ("please try again") requesting the user to submit a new message. As further shown, P2 may respond to the prompt with a new message ("I've never been late to work"). The IMMS may analyze the new message to determine whether the message exceeds a message score threshold and which, if any, remedial measure should be taken. For example, in this instance, the new message does not exceed the message score threshold and the IMMS takes no remedial measure, allowing the new message to be sent to user P1.

Figure 6:
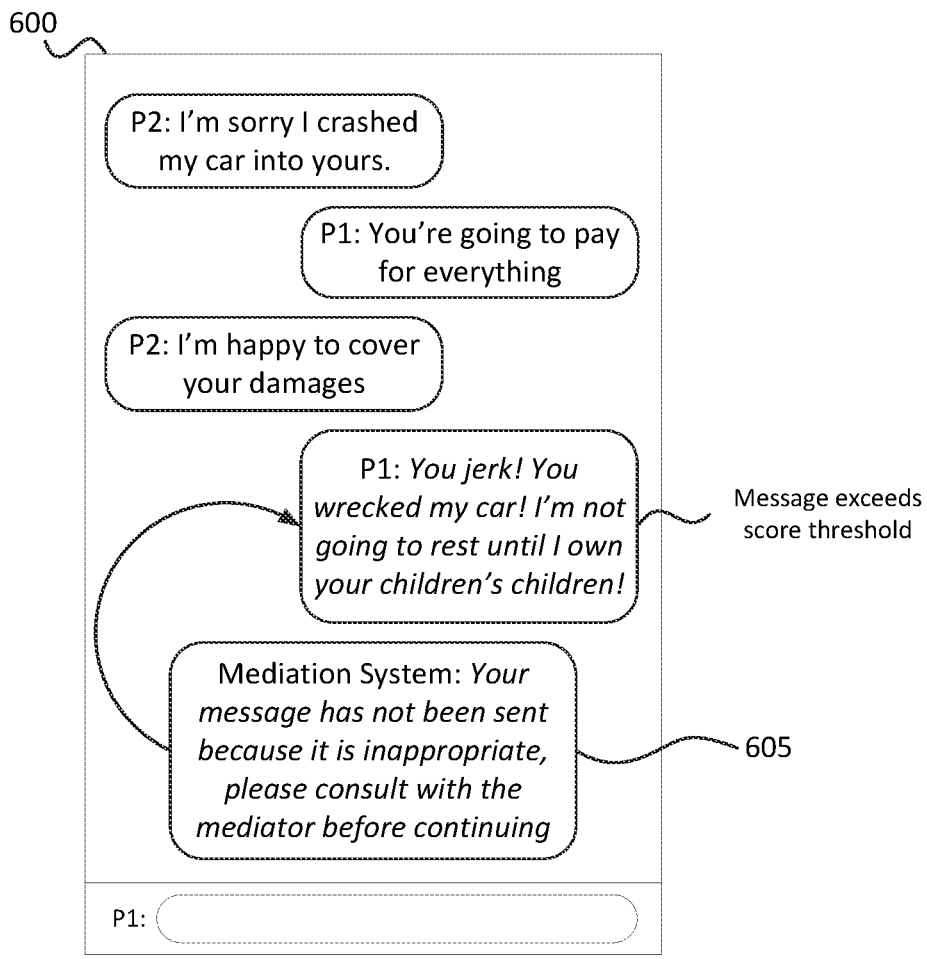
FIG. 6 illustrates an example application of the IMMS in which the IMMS detects a message exceeding the message score threshold and suggests mediator intervention.

In some embodiments, the IMMS may determine hostile intent by the sending participant, reject the message, and recommend mediator intervention. As shown in FIG. 6, for example, user P2 may submit a message saying, "You jerk! You wrecked my car! I'm not going to rest until I own your children's children!" In some embodiments, the IMMS may determine that this message exceeds a message score threshold. Here, for example, the message may exceed the message score threshold based on the intent of the message. The intent of the message may be determined using NLP and/or other suitable techniques. As shown, the IMMS may analyze the message and take an appropriate remedial measure. For example, in this instance, the IMMS may reject the message and recommend the user consult with a mediator before continuing (e.g., as depicted in message 605). In such instances, the IMMS may intercept future message(s) from the sending participant and prevent the intercepted message(s) from being sent, subject to approval by a mediator participant.

Figure 7:
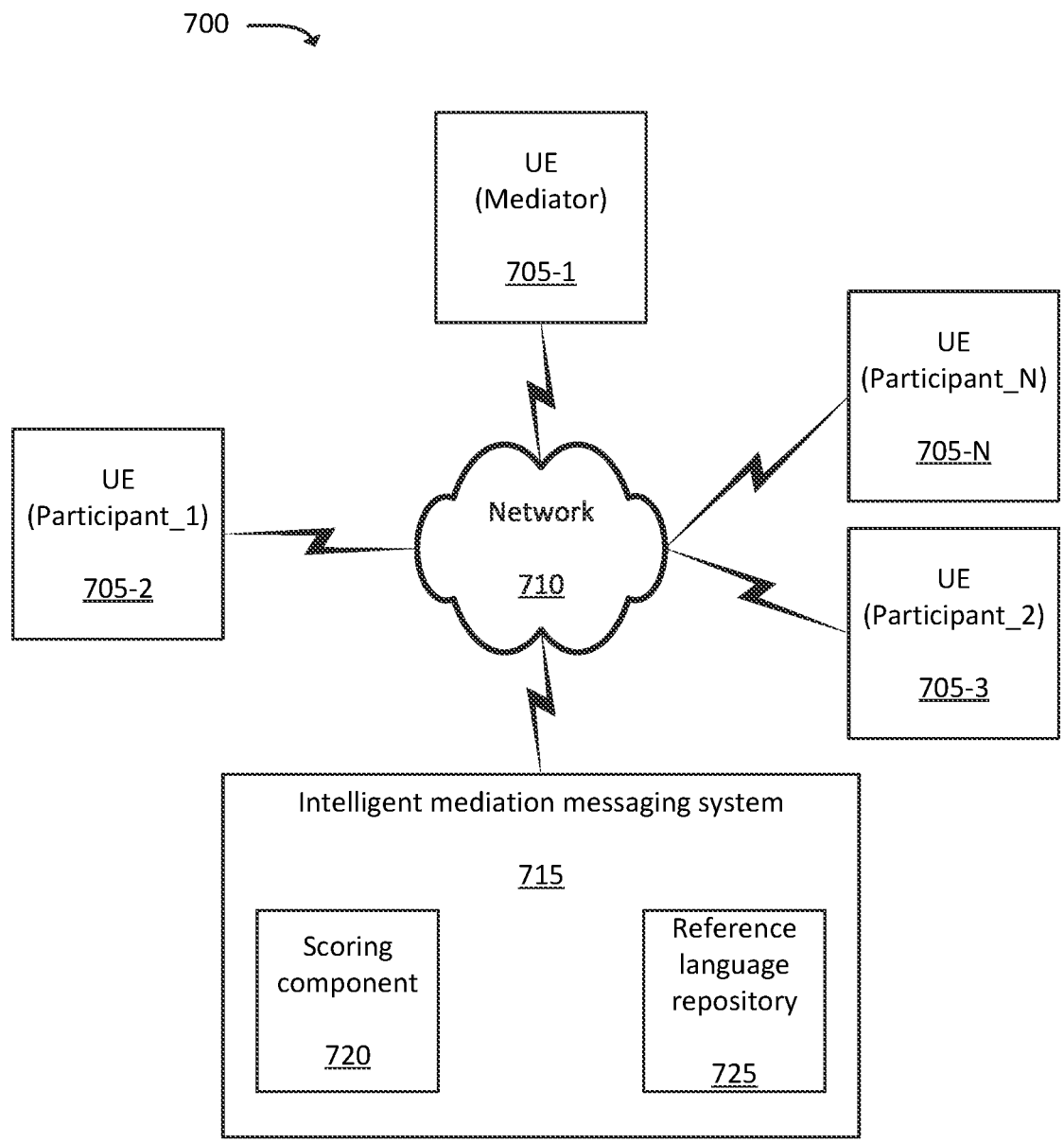
FIG. 7 illustrates an example environment in which one or more embodiments, described herein, may be implemented.

FIG. 7 illustrates example environment 700 in which one or more embodiments described herein may be implemented. Environment 700 may include UEs 705 (e.g., UE 705-1, 705-2, and 705-3 (collectively referred to herein as "UEs 705" or individually as "UE 705")), network 710, IMMS 715, scoring component 720, and reference language repository 725.

UEs 705 may include any device capable of sending, receiving, and displaying communications such as a computer, mobile telephone, and/or other devices. UE 705-1 may be associated with a mediator (e.g., any person or persons independent from the mediation participants who will advance mediation and/or otherwise intervene in conversations between participants). UEs 705-2 and 705-3 may be associated with at least two participants. In some embodiments, IMMS 715 may administer a mediation among more than two participants or allow multiple participant UEs for the same side of the mediation (e.g., to allow an insurance carrier and the insured party to participate in mediation opposing the plaintiff). UEs 710 may display user interfaces in accordance with some embodiments described herein. For example, UEs 705 may display user interfaces 100, 150, 200, 300, 400, 500, 550, and 600, where appropriate (e.g., per the limitations of which mediation participant receives which message).

FIG. 7 further depicts IMMS 715. IMMS 715 may contain one or more components, including, for example, scoring component 720 and/or reference language repository 725. IMMS 715 may administer a mediation between participants. As such, IMMS 715 may intercept and analyze sent messages to determine which, if any, remedial measures should be taken. In doing so, IMMS 715 may rely on one or more components, including, for example, scoring component 720 and reference language repository 725.

Scoring component 720 may determine a message score threshold as well as the individual message score for a particular message. As described below, the message score threshold may be adjusted according to several factors, including, but not limited to, the frequency of messages, the mediation temperature, the content of the message, and/or specific characteristics of the mediation participants. As further described below, the message score may be determined by the content of the message (e.g., including any contentious, congruous, or mitigating phrases and/or words) or message intent. Message intent may be determined using NLP and/or other suitable method to determine the intent of the phrases and/or words being used. For example, IMMS 715 may use NLP lexical semantic techniques to determine the contextual meaning of words.

Reference language repository 725 may be a database or other structured data storage repository designed to store information. In some embodiments, reference language repository 725 may include the reference phrase and/or word in addition to a score, alternative phrases and/or words, intent, and/or other information related to potential use for the phrase and/or word (e.g., syntactic role, common misspellings, etc.). Reference language repository 725 may additionally link related phrases and/or words (e.g., words with similar definitions, commonly misused words, and their proper counterparts, etc.).

Devices in environment 700 may communicate through network 710. Network 710 may include any network infrastructure, including wireless telecommunication networks (e.g., Fourth Generation (4G), Fifth Generation (5G) infrastructure, etc.), wired internet networks, local area networks, and/or other network systems which permit communication. Devices of environment 700 may interconnect with each other and/or other devices via wired connections, wireless connections, or a combination of wired and wireless connections.

The quantity of devices and/or networks, illustrated in FIG. 7, is provided for explanatory purposes only. In practice, environment 700 may include additional devices and/or networks; fewer devices and/or networks; different devices and/or networks; or differently arranged devices and/or networks than illustrated in FIG. 7. For example, as described above, in some embodiments there may be additional UEs 705. Alternatively, or additionally, one or more of the devices of environment 700 may perform one or more functions described as being performed by another one or more of the devices of environments 700. For example, UEs 705 may perform some functions of IMMS 715, such as analyzing or intercepting messages. In some implementations, one or more devices of environment 700 may be implemented by, be physically integrated in, and/or may be communicatively coupled with, one or more other devices of environment 700. For example, while IMMS 715 is displayed as a separate device, some or all of the functionality of IMMS 715 may be implemented by one or more devices (e.g., within UEs 705 and/or another device).

Figure 8:
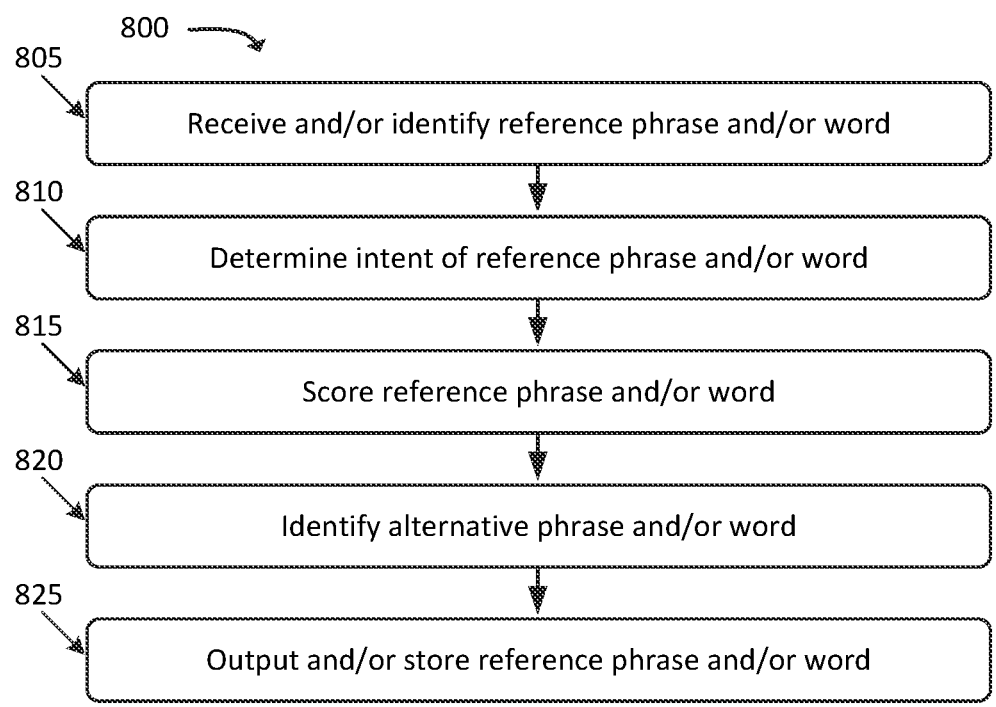
FIG. 8 illustrates an example process for scoring reference language, in accordance with some embodiments.

FIG. 8 illustrates a process 800 for scoring and storing or outputting phrases and/or words. In some embodiments, all or some of the process may be performed by scoring component 720 and/or by one or more devices and/or systems.

As shown, process 800 may include receiving and/or identifying (at 805) reference phrases and/or words. Reference phrases and/or words may be provided by IMMS 715 and/or one or more devices (e.g., reference language repository 725 or UEs 705, etc.). Identifying may consist of parsing (e.g., for example, using NLP techniques) phrases and/or words to different segments. For example, if scoring component 720 receives the message, "I want to take a break," process scoring component 720 may identify phrases such as "I want" or "to take a break" or individual words such as "break." Accordingly, each segment may be individually analyzed using process 800.

Process 800 may also include determining (at 810) the intent of the phrase and/or word. The phrase and/or word intent may be determined by using NLP or other suitable techniques to analyze several factors, including, but not limited to, the context in which the phrase and/or word is used and/or modifiers affecting the phrase and/or word. The phrase and/or word intent may be pertinent to determine what the phrase and/or word is being used to express in order to properly score the phrase and/or word (e.g., when scoring, at 815) and/or to establish what substitute phrase and/or word may be available (e.g., when identifying alternative phrases and/or words, at 820). For example, if the system identified a word, such as "break," it could be used to express the destruction of an object or the desire to take a rest.

Process 800 may also include scoring (at 815) the reference phrase and/or word. Scoring may occur, for example, on a score gradient depending on the intent of the language. For instance, scoring component 720 may provide the word "break" a more agreeable score (e.g., congruous language score, suitable language score, etc.) if the word is intended to describe "taking a rest" but may provide a less agreeable score (e.g., contentious language score, unsuitable language score, etc.) if the word is intended to describe "destroying an object." In some embodiments, if a mediation participant accepts or rejects an alternative phrase and/or word (e.g., alternative phrase and/or word determined at 820, used at 1040, for example), the suggested alternative phrase and/or word may be scored more or less agreeable, respectively, than the original phrase and/or word. For example, if a mediation participant accepts an alternative phrase of "take an intermission" to replace "take a break," the alternative phrase would receive a more agreeable (e.g., more suitable) score than the original phrase. Similarly, for example, if a mediation participant rejects the phrase "take time off" to replace "take a break," the alternative phrase would receive a less agreeable (e.g., less suitable) score than the original phrase.

Process 800 may also include identifying (at 820) alternative phrases and/or words. The alternative phrase and/or word may be identified through phrases and/or words of related intent (which may be determined through NLP and/or other suitable techniques). In some embodiments, when combined with a score (e.g., from 815), identifying (at 820) alternative phrases and/or words may allow the ability to compare related phrases and/or words with other related phrases and/or words with different scores. For example, the word "break," with the intent to describe "rest," may be associated with another word such as "intermission" (e.g., more suitable score, etc.), and/or a phrase such as "time off" (e.g., less suitable score, etc.). Process 800 may use NLP and/or other suitable techniques to contextually determine the intent of a phrase and/or word even if not configured to determine the intent through definition. For example, if scoring component 720 receives the phrase, "that's pretty fly," scoring component 720 may determine from context that the phrase means "cool."

Process 800 may also include outputting and/or storing (at 825) the reference phrase and/or word. For example, if process 800 is initiated by a determination to modify a message (e.g., from 945), the reference language may be output (e.g., to IMMS 715) and/or stored (e.g., in reference language repository 725). As an additional example, if process 800 is initiated by creating and/or updating reference language repository 725, the reference language may be stored (e.g., in reference language repository 725).

In some embodiments, the reference phrase and/or word may be output and/or stored along with the intent, identified alternative phrases and/or words (e.g., from 820) and correlating scores, a score (e.g., from 815), intent (e.g., from 810), and/or other information related to potential use for the phrase and/or word (e.g., syntactic role, common misspellings, etc.). For example, the word "break" may be output (or stored) with identified (e.g., from 820) alternative phrases and/or words with matching intent (e.g., "intermission," "rest," "time off," etc.) and correlating scores for alternative phrases and/or words.

Figure 9:
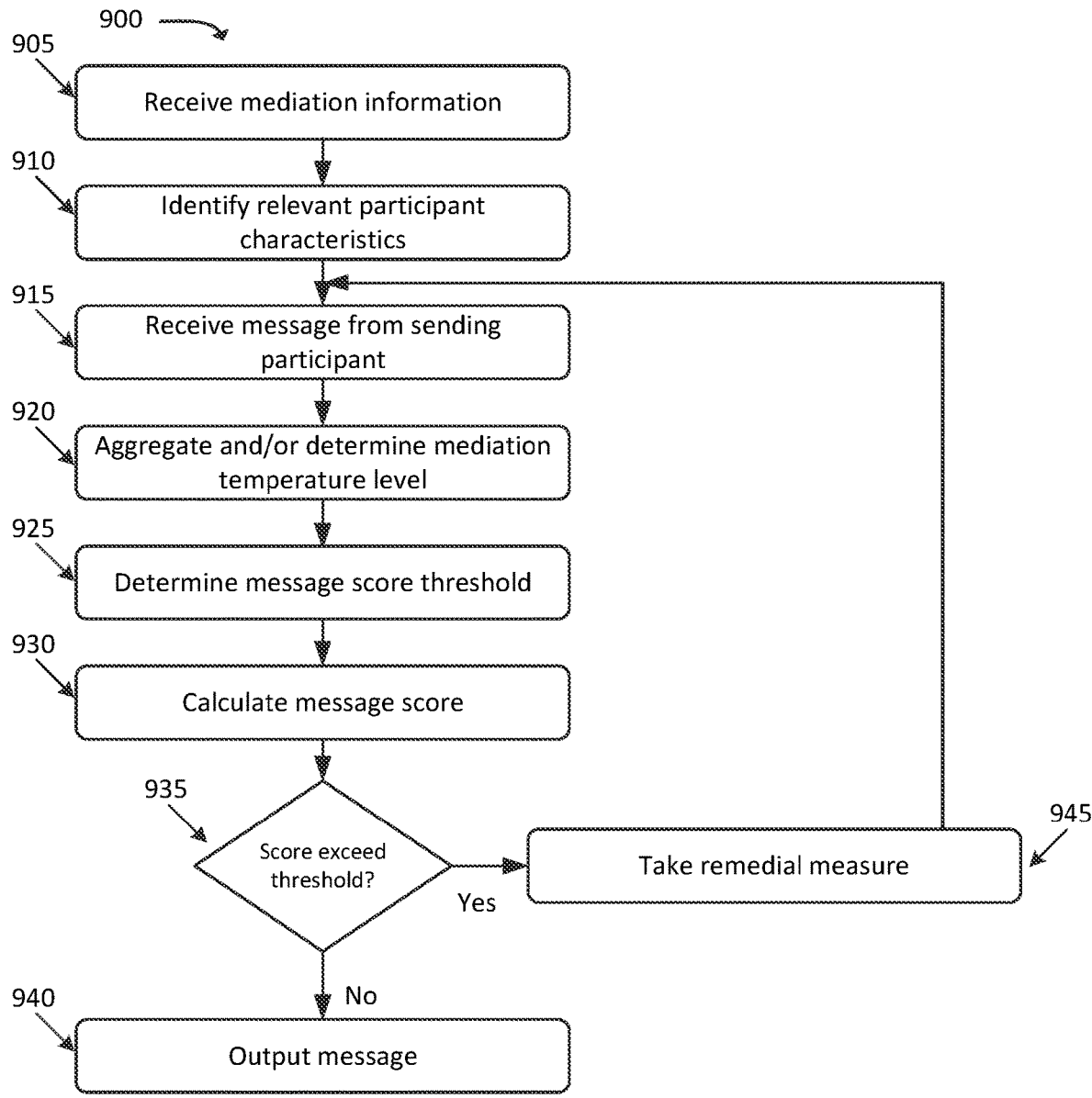
FIG. 9 illustrates an example process for processing a received message, in accordance with some embodiments.

FIG. 9 illustrates a process 900 for determining whether to take a remedial measure after receiving a message. In some embodiments, all or some of the process may be performed by IMMS 715 and/or by one or more devices and/or systems.

As shown, process 900 may include receiving (at 905) mediation information, which may include information regarding the participants (e.g., participant names, gender, nationality, age, relationship to other participants, and/or other demographic information about the participants, etc.) but may also include information regarding the mediation (e.g., information regarding the nature of the dispute, the length of the dispute, previous communications between the parties, and/or relevant evidence regarding the dispute, etc.) and/or other relevant information regarding the mediation (e.g., applicable laws, evidence, etc.).

Process 900 may also include identifying (at 910) relevant participant characteristics. Characteristics may include demographic information such as age, disposition, and relationships between participants, but also include statistical information, such as likeliness to prefer formal language, likeliness for dispositions towards gender or nationality, and/or other relevant characteristic traits. For example, IMMS 715 might receive (e.g., at 905) demographic information for a mediation wherein one of the participants is an older male. This demographic information may statistically suggest, for example, that the participant prefers being spoken to in more formal language. As such, IMMS 715 may identify (at 910) a desire for formal language as a relevant participant characteristic.

Process 900 may also include receiving (at 915) a message from the sending participant. The message may be in any data format such as short message service, multimedia messaging service, internet protocol-based messaging and/or other text-based messaging architecture.

Process 900 may include aggregating and/or determining (at 920) the mediation temperature level. The mediation temperature level may be an aggregate of various factors related to the ongoing mediation such as, the relationship between the participants (e.g., neighbors, parent and child, etc.), previous disputes between the participants, messages sent between the participants (e.g., messages sent during or preceding mediation), individual characteristics of the participants (e.g., a participant is "hot-headed," prefers formal language, or is easily insulted, etc.) and other relevant characteristics identified (e.g., from 910), and/or the nature of the incident arising to the particular mediation, etc. As the mediation continues, process 900 may continuously modify the mediation temperature level in accordance with considered factors. For example, IMMS 715 may aggregate an initially mild (e.g., low) mediation temperature between a parent and child. As provocative words are shared between the participants, IMMS 715 may aggregate a harsh (e.g., high) mediation temperature. Similarly, a harsh mediation temperature level may be moderated (e.g., lowered) as participants send placatory messages.

Process 900 may also include determining (at 925) a message score threshold. The message score threshold may be adjusted according to several factors, including, but not limited to, the frequency of messages, the mediation temperature level (e.g., from 920), the content of the message, and/or mediation information (e.g., from 905) including specific characteristics of the mediation participants. In some embodiments IMMS 715 may establish several message score thresholds of different magnitude corresponding with different remedial measures. These may be used in determining (e.g., at 945) which remedial measure to take (e.g., exceeding a more severe score threshold would be associated with a more severe remedial measure).

Process 900 may also include calculating (at 930) the score for the received message. The message score may be determined, for example, by passing the message through process 800. As discussed above, scoring the message may include segmenting the message into various phrases and/or words and processing each segment individually. Each segment containing phrases and/or words may be scored based on the intent, modifying descriptors (e.g., adjectives, adverbs, etc.), and/or other factors which can be used to determine the suitability of the segment. The message score may consider the aggregate of the various segments of phrases and/or words (e.g., each segment of the entire message).

Process 900 may include a determination (at 935) of whether the message score exceeds a score threshold. For example, in some embodiments, the message may be scored through process 800 and compared to the determined message score threshold (e.g., from 925). If the message score exceeds a message score threshold (at 935—Yes), process 900 may take a remedial measure (e.g., at 945). If the message does not exceed a message score threshold (at 935—No), process 900 may output the message (e.g., at 940).

Process 900 may further include outputting (at 940) the message to UEs 705 (e.g., UEs 705 associated with sending participant, receiving participant(s) and/or mediator(s)). In some embodiments, process 900 may output the message in any data format such as short message service, multimedia messaging service, internet protocol-based messaging and/or other text-based messaging architecture. The message may be transmitted over network 710. In some embodiments, the receiving participant may be queried (e.g., through a notification or display on UE 705) regarding whether the receiving participant perceives the message as suitable (e.g., on a scale of more to less suitable, etc.). The query may be initiated by a participant (e.g., voluntarily by the receiving participant or mandated by the sending participant) or by one or more devices (e.g., IMMS 715). This query may provide feedback to establish user-reinforced machine learning for reference language repository 725 and/or other data structures.

Process 900 may include taking (at 945) a remedial measure. Remedial measures may include modifying the message (e.g., process 1000), delaying the message (e.g., process 1100), and/or rejecting the message (e.g., process 1200). Process 900 may determine which remedial measure to take (at 945) by comparing the message score (e.g., from 930) and the message score threshold (e.g., from 925) to determine how much in excess the message score exceeds the message score threshold. In instances where the message score threshold is marginally exceeded by the message score, IMMS 715 may take a less severe remedial measure (e.g., delay the message). In instances where the message score threshold is greatly exceeded by the message score, IMMS 715 may take a more severe remedial measure (e.g., reject the message). In some embodiments, IMMS 715 may modify the message in any instance where a message score threshold is exceeded by the message score before pursuing other remedial measures. For example, if a message score scarcely exceeds the message score threshold, IMMS 715 may modify the message to lower the score before delaying the message. In some embodiments, IMMS 715 may use message score thresholds of different magnitudes to determine which remedial measure to take (e.g., exceeding a more severe score threshold results in a more severe remedial measure).

Figure 10:
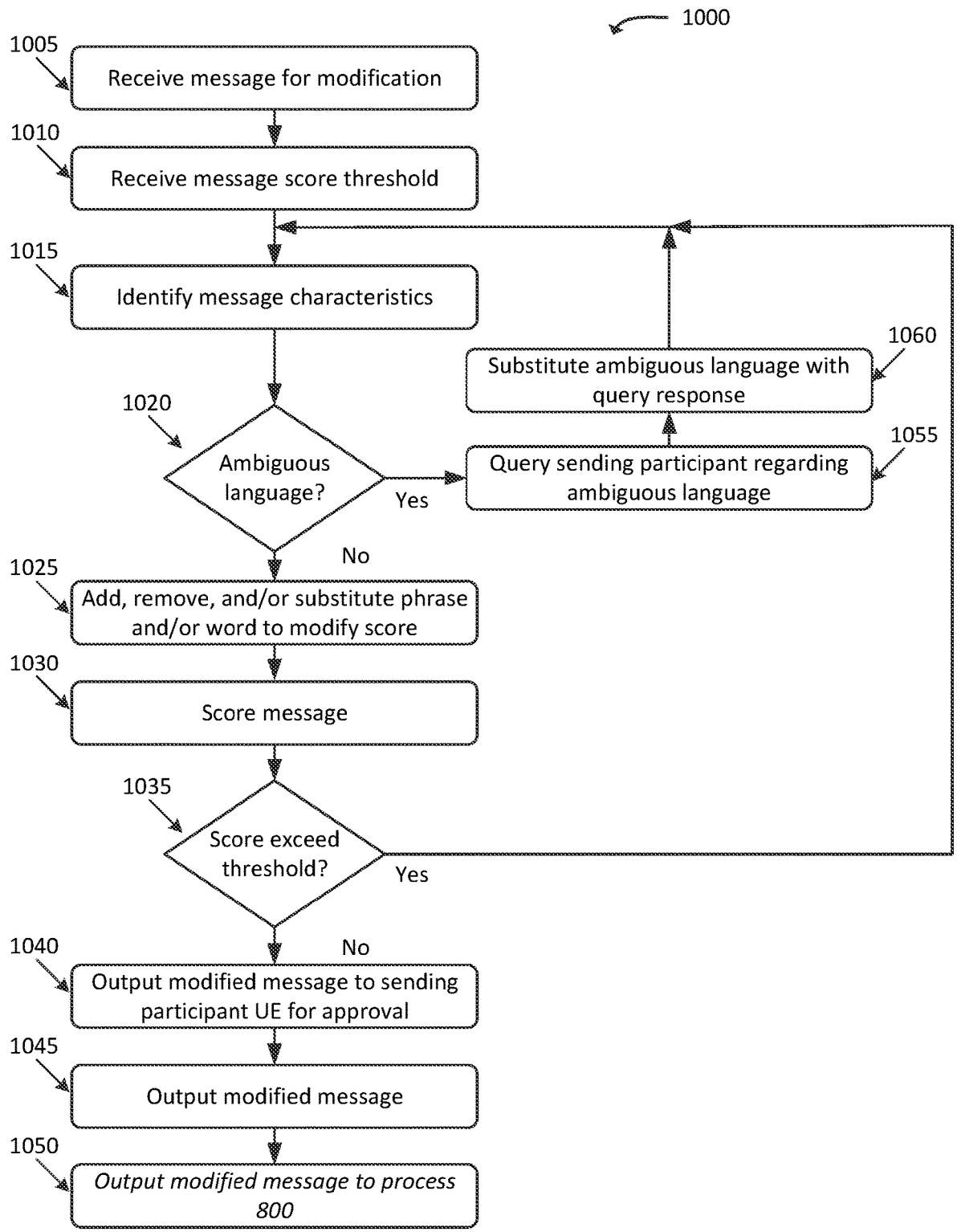
FIG. 10 illustrates an example process for remediating a message by modification, in accordance with some embodiments.

FIG. 10 illustrates a process 1000 for remedying a message through modification. In some embodiments, some or all of process 1000 may be performed by IMMS 715 and/or by one or more other devices or systems. As discussed above, process 1000 may be favored in any instance where the message score exceeds the message score threshold. Process 1000 is demonstrated, for example, in FIGS. 1A & 1B and FIG. 4.

As shown, process 1000 may include receiving (at 1005) a message for modification. As discussed above, process 900 may determine (e.g., at 945) to modify a message if the message score exceeds a message score threshold (e.g., from 935).

Process 1000 may include receiving (at 1010) the message score threshold. As discussed above, the message score threshold takes into consideration several factors, including, but not limited to, the relationship between the participants (e.g., neighbors, parent/child, etc.), previous disputes between the participants, messages sent between the participants (e.g., messages sent during or preceding mediation), relevant characteristics of the participants (e.g., a participant is "hot-headed" or easily angered, demographic information, dispositions, etc.), and/or the nature of the incident arising to the particular mediation. The message score threshold provides a level, which if exceeded, may indicate the need to further modify the received message (e.g., from 1005).

Process 1000 may also include identifying (at 1015) message characteristics. This segments the message into pieces of phrases and/or words which may be modified to increase or lower the message score. In some embodiments, each segment of phrases and/or words may be scored (e.g., through process 800) to identify segments for modification based on segment score.

In some embodiments, process 1000 may maintain a repository and/or utilize NLP and/or other suitable techniques to identify phrases and/or words that are ambiguous or unclear for a determination (at 1020) whether there is ambiguous language present. This determination may be made based on identified (e.g., from 1015) message characteristics. Ambiguous language may include language that is vague or has multiple definitions which cannot be distinguished in the context. For example, some phrases, such as "this is stupid," does not provide a clear context of the message intent because the word "stupid" may refer to any number of descriptors (e.g., adverbs, adjectives, etc.) which may more accurately express the sending participant's intent.

Process 1000 may include determining (at 1020) whether there is ambiguous language present in the message. As discussed above, ambiguous language may include phrases and/or words that are vague or have no ascertainable meaning. In response to detecting ambiguous language (at 1020—Yes), process 1000 may query (at 1055) the sending participant regarding the ambiguous language. Process 1000 may output a message to the sending participant (e.g., notification message 410) to indicate the request to receive an explanatory information. In some embodiments, process 1000 may substitute (at 1060) the ambiguous language with the more defined language provided by the sending participant. The message containing substitute language may undergo parts of process 1000 as the original message (e.g., from 1015-1060).

In response to not detecting (at 1020—No) ambiguous language, process 1000 may include adding, removing, and/or substituting (at 1025) phrases and/or words to modify the message score. Process 1000 may utilize a data repository (e.g., reference language repository 725) to determine alternative language to add, substitute, and/or replace phrases and/or words in the original message. As discussed above, phrases and/or words may be associated with a score, but may also include alternative phrases and/or words with corresponding scores. When modifying the message, process 1000 may consider message syntax (e.g., syntax data stored with reference language or determined through NLP and/or other suitable processes, etc.) and organize alternative phrases and/or words to be grammatically correct.

Process 1000 may further include scoring (at 1030) the modified message. The modified message score may be determined, for example, by passing the modified message through process 800. As discussed above, scoring the modified message may include segmenting the modified message into various phrases and/or words and processing each segment individually. Each segment containing phrases and/or words may be scored based on the intent, modifying language (e.g., adjectives, adverbs, etc.), and/or other factors which can be used to determine the suitability of the segment. The message score may consider the aggregate of the various segments of phrases and/or words (e.g., the entire modified message).

Process 1000 may include detecting (at 1035) whether the modified message score exceeds a message score threshold. IMMS 715 may utilize the previously obtained message score (e.g., from 1030) or message score threshold (e.g., from 1010). In some embodiments, if the modified message score exceeds the score threshold (at 1035—Yes) process 1000 may iterate the modification process to further moderate the message score (e.g., repeat process 1000 from 1015-1035).

Upon determining that the modified message score does not exceed the score threshold (at 1035—No), process 1000 may output (at 1040) the modified message to UE 705 associated with the sending participant for approval. In some embodiments, process 1000 may output the modified message in any data format such as short message service, multimedia messaging service, internet protocol-based messaging and/or other text-based messaging architecture. In some embodiments, the modified message may be transmitted over network 710. In some embodiments, the sending participant may be queried (e.g., through a notification or display on UE 705) regarding whether the sending participant perceives the modified message as suitable (e.g., on a scale of more to less suitable, etc., based on the modified phrases and/or words). The query may be initiated by the sending participant or one or more devices (e.g., IMMS 715). This query may provide feedback to establish user-reinforced machine learning for reference language repository 725 and/or other data structures. In some embodiments, the sending participant may further modify the modified message. In such instances, the received message may be treated as a new message and may be submitted to process 900.

Process 1000 may further include outputting (at 1045) the modified message to UEs 705 (e.g., UEs 705 associated with sending participant, receiving participant(s) and/or mediator(s)). In some embodiments, process 1000 may output the modified message in any data format such as short message service, multimedia messaging service, internet protocol-based messaging and/or other text-based messaging architecture. In some embodiments, the modified message may be transmitted over network 710. In some embodiments, the receiving participant may be queried (e.g., through a notification or display on UE 705) regarding whether the receiving participant perceives the message as suitable (e.g., on a scale of more to less suitable, etc.). The query may be initiated by a participant (e.g., voluntarily by the receiving participant or mandated by the sending participant) or by one or more devices (e.g., IMMS 715). This query may provide feedback to establish user-reinforced machine learning for reference language repository 725 and/or other data structures.

Process 1000 may include outputting (at 1050) the modified message to process 800. As discussed above, process 800 may score, store, and/or output reference language. As described above, process 1000 may favor outputting the modified message to process 800 particularly if participant UE 710 provides an affirmative or negative response to the output modified message (e.g., at 1040). Outputting the modified message to process 800 may, for example, provide feedback to establish user-reinforced machine learning for reference language repository 725 and/or other data structures.

Figure 11:
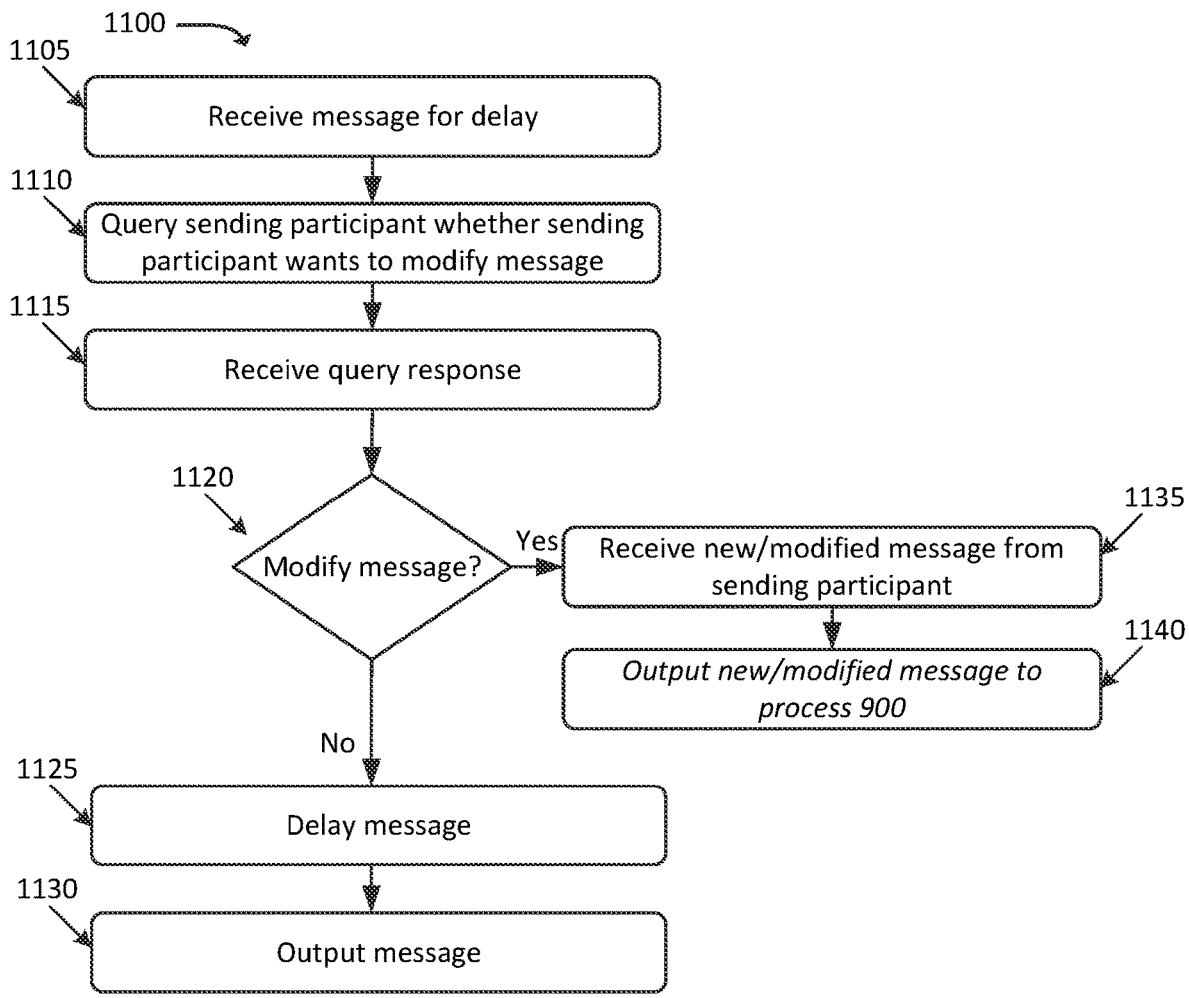
FIG. 11 illustrates an example process for remediating a message by delay, in accordance with some embodiments.

FIG. 11 illustrates a process 1100 for remedying a message through delay. In some embodiments, some or all of process 1100 may be performed by IMMS 715 and/or by one or more other devices or systems. As discussed above, process 1100 may be favored, for example, in instances when a message score marginally exceeds the message score threshold. Process 1100 is demonstrated, for example, in FIG. 2.

As shown, process 1100 may include receiving (at 1105) a message for delay. As discussed above, IMMS 715 may determine (e.g., at 945) to delay a message if the message score exceeds a message score threshold (e.g., at 935).

Process 1100 may also include querying (at 1110) the sending participant whether the sending participant wants to modify the message. As shown in FIG. 2 (e.g., at 205), the message may indicate the reason for the delay. This delay may cause the sending participant to reconsider sending the message.

Process 1100 may further include receiving (at 1115) the query response from sending participant. The response from the sending participant may take different forms. For example, in some embodiments, the sending participant may be able to directly modify the message as displayed on UE 705 (e.g., modify the message as displayed in user interfaces 100, 150, 200, 300, 400, 500, 550, and 600). As a further example, in some embodiments, the sending participant may be able to send a message indicating the desire to modify the message held for delay. In such instances, IMMS 715 may be able to use NLP and/or other suitable techniques to determine that a message from the user is a response to the prompt (e.g., an affirmative response such as "yes," "yeah," "definitely," etc., even if these responses are not pre-configured to be recognized by IMMS 715).

Process 1100 may include determining (at 1120) whether the sending participant desires to modify the message. Upon a determination that the sending participant desires to modify the message (at 1120—Yes) process 1100 may receive (at 1135) the new or modified message from the sending participant. In that instance, process 1100 may further output (at 1140) the new or modified message received (e.g., from 1135) to process 900.

In instances where process 1100 does not determine (at 1120—No) that the sending participant desires to modify the message, process 1100 may include delaying (at 1125) the message from output. The message delay period may be determined by various factors, including, the mediation temperature, message frequency, and/or the amount the message score exceeded a message score threshold. For example, if several messages are sent in high frequency, the delay may be longer compared to messages sent in low frequency. In some embodiments, UEs 705 may display the delay period before sending the message.

Process 1100 may further include outputting (at 1130) the message to UEs 705 (e.g., UEs 705 associated with sending participant, receiving participant(s) and/or mediator(s)). In some embodiments, process 1100 may output the message in any data format such as short message service, multimedia messaging service, internet protocol-based messaging and/or other text-based messaging architecture. The message may be sent over network 710. In some embodiments, the receiving participant may be queried (e.g., through a notification or display on UE 705) regarding whether the receiving participant perceives the message as suitable (e.g., on a scale of more to less suitable, etc.). The query may be initiated by a participant (e.g., voluntarily by the receiving participant or mandated by the sending participant) or by one or more devices (e.g., IMMS 715). This query may provide feedback to establish user-reinforced machine learning for reference language repository 725 and/or other data structures.

Figure 12:
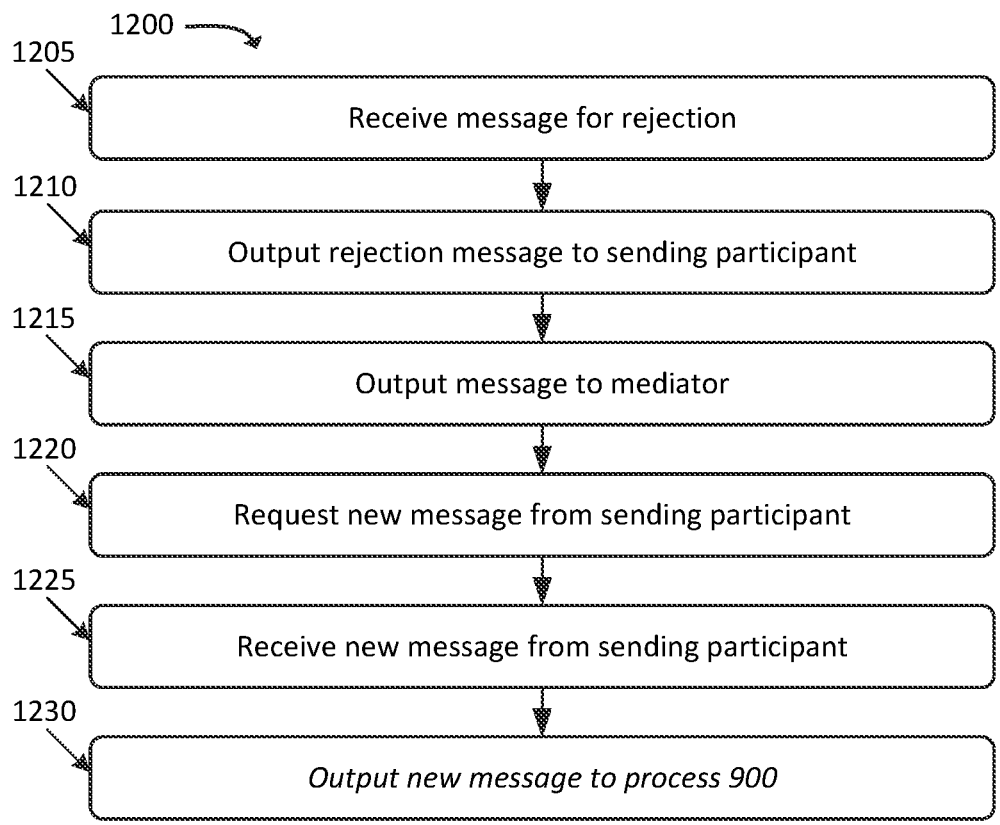
FIG. 12 illustrates an example process for remediating a message by rejection, in accordance with some embodiments.

FIG. 12 illustrates a process 1200 for remedying a message by rejecting the message. In some embodiments, some or all of process 1200 may be performed by IMMS 715 and/or by one or more other devices or systems. As discussed above, process 1200 may be favored, for example, in instances when a message score exceedingly surpasses the message score threshold. Process 1200 is demonstrated, for example, in FIG. 3 and FIG. 6.

As shown, process 1200 may include receiving (at 1205) a message for rejection. As discussed above, process 900 (e.g., at 945) may determine to modify a message if the message score exceeds a message score threshold (e.g., at 935).

Process 1200 may include outputting (at 1210) a rejection message to the sending participant. The rejection message may indicate the reason why the message was not sent to the receiving participant (e.g., as demonstrated in messages 305 and 605).

Process 1200 may further embody outputting (at 1215) the received message (e.g., from 1205) to mediator UE 705. This provides the opportunity for the mediator participant to monitor and observe the progression of the mediation. In such instances (e.g., for example, as exemplified in FIG. 6, message 605), process 1200 may suggest to the sending participant that the mediator participant take a more involved role in the mediation. In some embodiments, future messages from the sending participant may be submitted to the mediator for approval. For example, IMMS 715 may receive a message for rejection and provide the message to UE 705 associated with a mediator (e.g., 705-1) but not to UE 705 associated with a receiving participant. This may allow for the mediator participant to advise the sending participant with more knowledge than what is otherwise visible in the mediation exchange (e.g., the mediator will be able to see rejected messages when attempting to advise a mediation participant).

In some embodiments, process 1200 may output (at 1215) the message in any data format such as short message service, multimedia messaging service, internet protocol-based messaging and/or other text-based messaging architecture. The message may be output through network 710.

Process 1200 may further include requesting (at 1220) a new message from the sending participant. As demonstrated, for example, in FIG. 3 (e.g., at message 305), this may occur in the original rejection message output (e.g., at 1210) to the sending participant.

Process 1200 may additionally include receiving (at 1225) a new message from the sending participant. In some embodiments, process 1200 may receive the message in any data format such as short message service, multimedia messaging service, internet protocol-based messaging and/or other text-based messaging architecture. The message may be received through network 710.

Process 1200 may include outputting (at 1230) the new received message (e.g., from 1225) to process 900. In some embodiments, process 1200 may output the new received message in any data format such as short message service, multimedia messaging service, internet protocol-based messaging and/or other text-based messaging architecture. The message may be transmitted over network 710.

Figure 13:
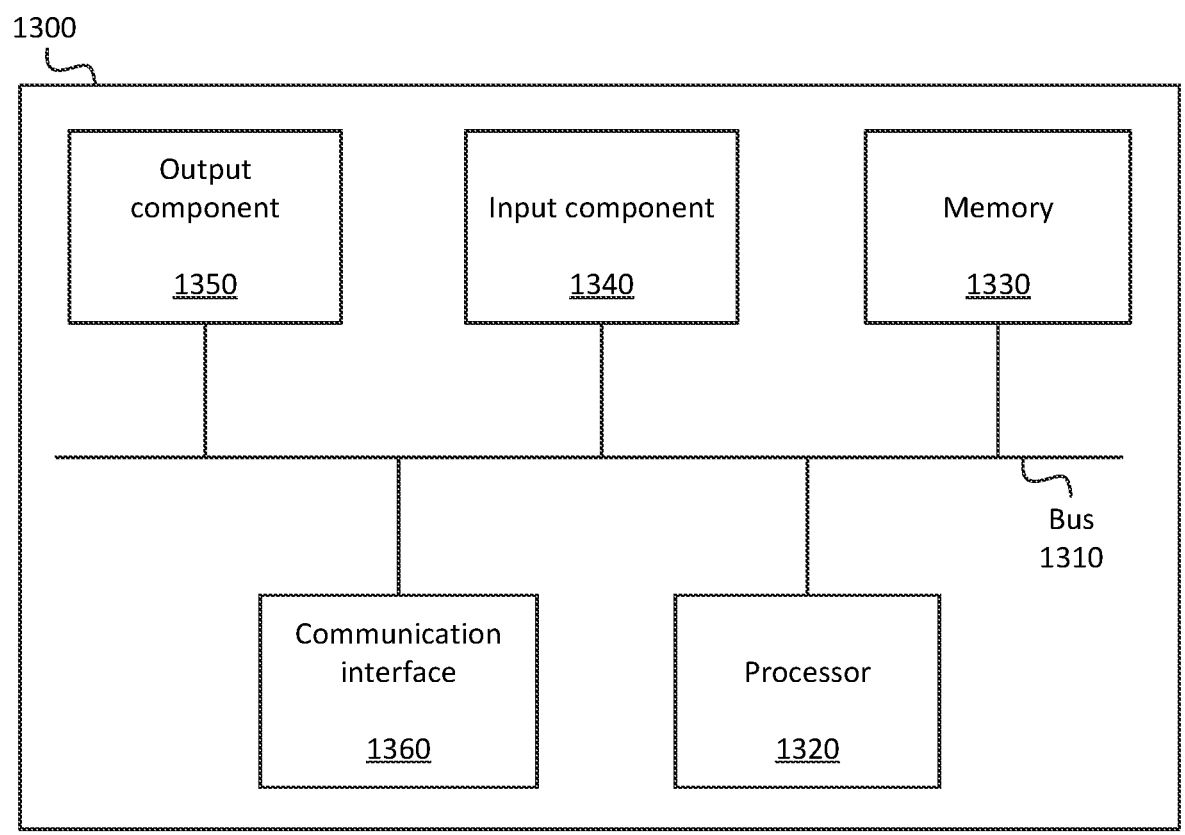
FIG. 13 illustrates example components of one or more devices, according to one or more embodiments described herein.

FIG. 13 illustrates example components of device 1300. One or more of the devices described above may include one or more devices 1300. Device 1300 may include bus 1310, processor 1320, memory 1330, input component 1340, output component 1350, and communication interface 1360. In another implementation, device 1300 may include additional, fewer, different, or differently arranged components.

Bus 1310 may include one or more communication paths that permit communication among the components of device 1300. Processor 1320 may include a processor, microprocessor, or processing logic that may interpret and execute instructions. Memory 1330 may include any type of dynamic storage device that may store information and instructions for execution by processor 1320, and/or any type of non-volatile storage device that may store information for use by processor 1320.

Input component 1340 may include a mechanism that permits an operator to input information to device 1300, such as a keyboard, a keypad, a button, a switch, etc. Output component 1350 may include a mechanism that outputs information to the operator, such as a display, a speaker, one or more light emitting diodes ("LEDs"), etc.

Communication interface 1360 may include any transceiver-like mechanism that enables device 1300 to communicate with other devices and/or systems. For example, communication interface 1360 may include an Ethernet interface, an optical interface, a coaxial interface, or the like. Communication interface 1360 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1300 may include more than one communication interface 1360. For instance, device 1300 may include an optical interface and an Ethernet interface.

Device 1300 may perform certain operations relating to one or more processes described above. Device 1300 may perform these operations in response to processor 1320 executing software instructions stored in a computer-readable medium, such as memory 1330. A computer-readable medium may be defined as a non-transitory memory device. A memory device may include space within a single physical memory device or spread across multiple physical memory devices. The software instructions may be read into memory 1330 from another computer-readable medium or from another device. The software instructions stored in memory 1330 may cause processor 1320 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described with regard to FIGS. 8 through 12, the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

Some implementations are described herein in conjunction with thresholds. To the extent that the term "exceeds" (or similar terms) is used herein to describe a relationship of a value to a threshold, it is to be understood that the term "greater than or equal to" (or similar terms) could be similarly contemplated, even if not explicitly stated. Similarly, to the extent that the term "less than" (or similar terms) is used herein to describe a relationship of a value to a threshold, it is to be understood that the term "less than or equal to" (or similar terms) could be similarly contemplated, even if not explicitly stated.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
a non-transitory computer-readable medium storing a set of processor-executable instructions; and
one or more processors configured to execute the set of processor-executable instructions, wherein executing the set of processor-executable instructions causes the one or more processors to:
identify a plurality of messages between a first User Equipment ("UE") and a second UE via a network;
utilize natural language processing techniques to determine a first intent of the plurality of messages;
receive a particular message input at the first UE, wherein a specified recipient of the second message is the second UE;
utilize natural language processing techniques to determine that the particular message is associated with a set of candidate intents including at least a second intent or a third intent;
generate a score associated with the plurality of messages based on the first intent;
select, based on the first intent of the plurality of messages, one of the second intent or the third intent from the set of candidate intents for the particular message, wherein the second intent is selected for the particular message when the score exceeds a threshold score;
receive an instruction, based on a user input at the first UE, to provide the particular message from the first UE to the second UE via the network; and
process, based on receiving the instruction to provide the particular message from the first UE to the second UE via the network, the particular message based on the selected intent from the set of candidate intents, the processing including:
when the second intent is selected, performing one or more remedial measures on the particular message in lieu of outputting the particular message to the second UE via the network, and
when the third intent is selected, outputting the particular message to the second UE via the network without performing the one or more remedial measures.

2. The device of claim 1, wherein the one or more remedial measures include outputting a prompt for a replacement message to replace the particular message.

3. The device of claim 2, wherein the one or more processors are further configured to determine that the replacement message is not associated with the second intent, wherein performing the one or more remedial measures includes outputting the replacement message to the second UE in lieu of the particular message.

4. The device of claim 1, wherein the one or more processors are further configured to:
identify a relationship between the first UE and the second UE based on respective social media accounts associated with the first UE and the second UE, wherein the selecting is based on the identified relationship.

5. The device of claim 1, wherein performing one or more remedial measures on the particular message includes receiving a first replacement message for the particular message, identifying a second replacement message based on the first replacement message, and outputting the second replacement message to the second UE in lieu of the particular message.

6. The device of claim 1, wherein the one or more remedial measures include intercepting the particular message and one or more subsequent messages, wherein the particular message and the one or more subsequent messages are not sent to the second UE without receiving approval from a third UE.

7. A non-transitory computer-readable medium, storing a set of processor-executable instructions, which, when executed by one or more processors, cause the one or more processors to:
identify a plurality of messages between a first User Equipment ("UE") and a second UE via a network;
utilize natural language processing techniques to determine a first intent of the plurality of messages;
receive a particular message input at the first UE, wherein a specified recipient of the second message is the second UE;
utilize natural language processing techniques to determine that the particular message is associated with a set of candidate intents including at least a second intent or a third intent;
generate a score associated with the plurality of messages based on the first intent;
select, based on the first intent of the plurality of messages, one of the second intent or the third intent from the set of candidate intents for the particular message, wherein the second intent is selected for the particular message when the score exceeds a threshold score;
receive an instruction, based on a user input at the first UE, to provide the particular message from the first UE to the second UE via the network; and
process, based on receiving the instruction to provide the particular message from the first UE to the second UE via the network, the particular message based on the selected intent from the set of candidate intents, the processing including:
when the second intent is selected, performing one or more remedial measures on the particular message in lieu of outputting the particular message to the second UE via the network, and
when the third intent is selected, outputting the particular message to the second UE via the network without performing the one or more remedial measures.

8. The non-transitory computer-readable medium of claim 7, wherein the one or more remedial measures include outputting a prompt for a replacement message to replace the particular message.

9. The non-transitory computer-readable medium of claim 8, wherein the plurality of processor-executable instructions further include processor-executable instructions to determine that the replacement message is not associated with the second intent, wherein performing the one or more remedial measures includes outputting the replacement message to the second UE in lieu of the particular message.

10. The non-transitory computer-readable medium of claim 7, wherein the plurality of processor-executable instructions further include processor-executable instructions to:
identify a relationship between the first UE and the second UE based on respective social media accounts associated with the first UE and the second UE, wherein the selecting is based on the identified relationship.

11. The non-transitory computer-readable medium of claim 7, wherein performing one or more remedial measures on the particular message includes receiving a first replacement message for the particular message, identifying a second replacement message based on the first replacement message, and outputting the second replacement message to the second UE in lieu of the particular message.

12. The non-transitory computer-readable medium of claim 7, wherein the one or more remedial measures include intercepting the particular message and one or more subsequent messages, wherein the particular message and the one or more subsequent messages are not sent to the second UE without receiving approval from a third UE.

13. A method, comprising:
identifying a plurality of messages between a first User Equipment ("UE") and a second UE via a network;
utilizing natural language processing techniques to determine a first intent of the plurality of messages;
receiving a particular message input at the first UE, wherein a specified recipient of the second message is the second UE;
utilizing natural language processing techniques to determine that the particular message is associated with a set of candidate intents including at least a second intent or a third intent;
generating a score associated with the plurality of messages based on the first intent;
selecting, based on the first intent of the plurality of messages, one of the second intent or the third intent from the set of candidate intents for the particular message, wherein the second intent is selected for the particular message when the score exceeds a threshold score;
receiving an instruction, based on a user input at the first UE, to provide the particular message from the first UE to the second UE via the network; and
processing, based on receiving the instruction to provide the particular message from the first UE to the second UE via the network, the particular message based on the selected intent from the set of candidate intents, the processing including:
when the second intent is selected, performing one or more remedial measures on the particular message in lieu of outputting the particular message to the second UE via the network, and
when the third intent is selected, outputting the particular message to the second UE via the network without performing the one or more remedial measures.

14. The method of claim 13, wherein the one or more remedial measures include outputting a prompt for a replacement message to replace the particular message.

15. The method of claim 13, further comprising:
identifying a relationship between the first UE and the second UE based on respective social media accounts associated with the first UE and the second UE, wherein the selecting is based on the identified relationship.

16. The method of claim 13, wherein performing one or more remedial measures on the particular message includes receiving a first replacement message for the particular message, identifying a second replacement message based on the first replacement message, and outputting the second replacement message to the second UE in lieu of the particular message.

17. The method of claim 13, wherein the one or more remedial measures include intercepting the particular message and one or more subsequent messages, wherein the particular message and the one or more subsequent messages are not sent to the second UE without receiving approval from a third UE.

18. The method of claim 14, further comprising determining that the replacement message is not associated with the second intent, wherein performing the one or more remedial measures includes outputting the replacement message to the second UE in lieu of the particular message.

\* \* \* \* \*